June 3, 1930.  J. L. DRAKE  1,761,195
APPARATUS FOR FORMING SHEET GLASS
Filed Feb. 19, 1926

INVENTOR.
John L. Drake.
Frank Fraser
ATTORNEY.

Patented June 3, 1930

1,761,195

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

APPARATUS FOR FORMING SHEET GLASS

Application filed February 19, 1926. Serial No. 89,266.

The present invention relates to an improved apparatus for and process of conditioning a mass of molten glass in order that it may be satisfactorily worked, and has particular reference to forming sheet glass therefrom.

An object of the present invention is to maintain a positive heat absorbing atmosphere above a mass of molten glass from which a glass sheet may be drawn, and also means whereby a positive heat absorbing atmosphere may be maintained around said sheet while being formed.

Another object of the invention is to provide a sheet glass drawing apparatus with means whereby said sheet may be formed within a positively controlled heat absorbing atmosphere.

Another object of the invention is to provide a sheet glass drawing apparatus with means whereby a sheet of glass may be drawn a relatively short distance vertically through a positively controlled artificially created heat absorbing atmosphere, and then bent into a horizontal plane while still plastic.

A further object of the invention is to provide a sheet glass drawing apparatus with means whereby the glass sheet being drawn will be set, in an artificially created, positively controlled, heat absorbing atmosphere.

A still further object of the invention is to provide a sheet glass apparatus with means whereby the temperature of the sheet being drawn will be solely dependent upon the temperature of an artificially created, positively controlled, heat absorbing atmosphere.

Other objects and advantages of the invention will become apparent during the course of the following description.

Figure 1:
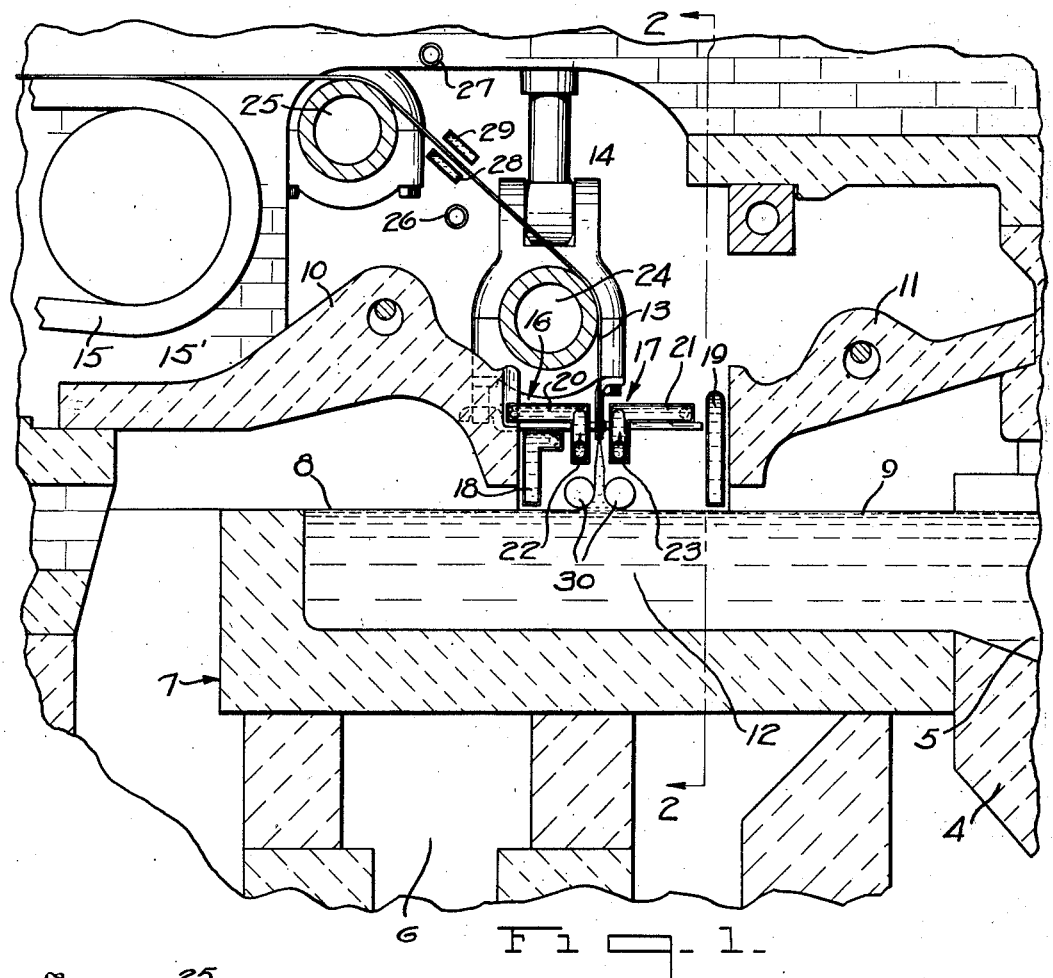
Figure 2:
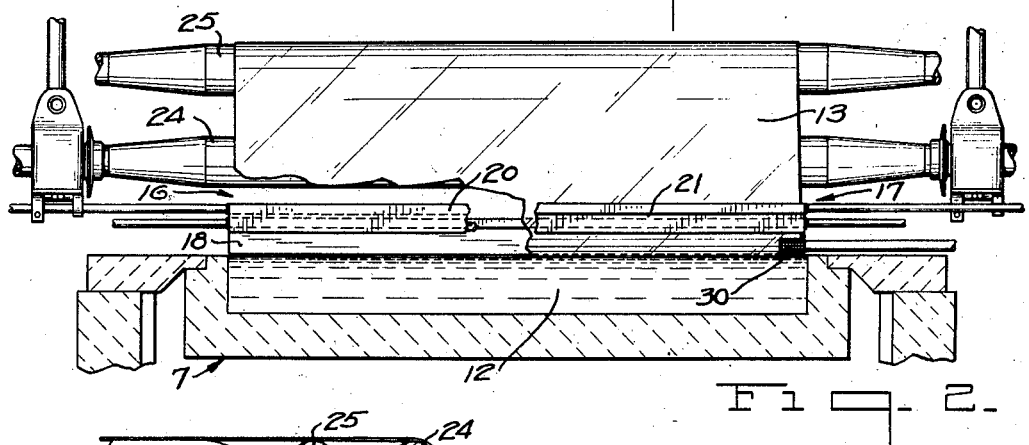
Figure 3:
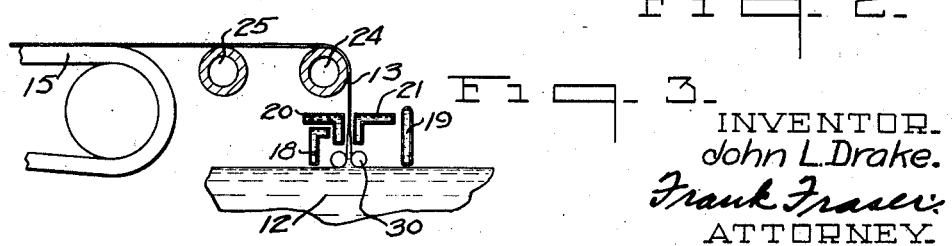

In the drawings wherein like numerals are employed to designate like parts throughout the same, Fig. 1 is a longitudinal section through a sheet glass drawing apparatus showing the improved device in position, Fig. 2 is a transverse section taken substantially on line 2—2 of Fig. 1, and Fig. 3 is a modified form of the invention.

Referring to the drawings in detail, the numeral 4 designates a tank furnace in which a supply of molten glass 5 is maintained. In open communication with the tank furnace and supported in a heater chamber 6 is a draw pot 7, adapted to receive molten glass from the furnace. Covering the molten glass areas 8 and 9 at the ends of the pot are lip tiles 10 and 11 which deflect the highly heated air currents that escape from the tank furnace and from beneath the draw pot upon the surface thereof, thus maintaining this molten glass at a relatively high temperature. Lying centrally within the pot between the two glass areas 8 and 9 is an exposed glass area 12 from which a glass sheet 13 is vertically drawn in an open drawing chamber 14 by a suitable drawing mechanism 15 in a flattening chamber 15'.

It is the proper conditioning of this molten glass area 12 and the forming of the sheet 13 drawn therefrom to which the present invention has particular reference.

In order to successfully draw a sheet of glass from molten glass, it has proved necessary to maintain the area of molten glass from which the sheet is drawn at a somewhat lower temperature than its supplying glass areas, thereby increasing its viscosity.

In accordance with the present invention this may be done positively by maintaining above the glass area 12 and extending throughout its entire width on each side of the sheet 13 a substantially enclosed artificial heat absorbing atmosphere. This artificial heat absorbing atmosphere is preferably created above the prescribed molten glass area 12 by cooled enclosures 16 and 17 out of contact with the glass, and formed with a pair of cooled vertical members 18 and 19 positioned immediately in front of the lip tiles 10 and 11, and a pair of cooled horizontal members 20 and 21, having L-shaped ends 22 and 23, nearest the sheet and out of contact therewith, said members 20 and 21 positioned at the upper extremity of the cooled vertical members 18 and 19. The temperature of this atmosphere and likewise the temperature of the molten glass area 12 may be then positively controlled by controlling the circulation of the cooling medium circulating through the members 18, 19, 20 and 21. The cooled enclosures 16 and 17 also function to cool the highly heated gases escaping from beneath lip tiles 10 and 11.

Heretofore it has been the practice to draw a sheet vertically within an open drawing chamber to an approximate height of two feet from an exposed mass of molten glass, and then bend the sheet into a horizontal plane over bending or deflecting members, more fully disclosed in the patent to Colburn, 1,248,809, granted December 4, 1917, which has proved commercially successful. It was believed necessary to draw the sheet vertically to this height in order to permit the sheet to become permanently set and yet pliable enough to satisfactorily deflect it into a horizontal plane. The heating or cooling of the sheet was dependent upon the inherent temperature of the atmosphere surrounding it within the drawing chamber. The temperature of this atmosphere was continuously subjected to considerable fluctuation due to drafts caused from numerous sources. In accordance with the present invention the setting of the sheet may be done positively by drawing it through an artificial heat absorbing atmosphere created between the L-shaped ends 22 and 23 on the cooled horizontal members 20 and 21 of the enclosures 16 and 17 at the source of the sheet, which, it is believed, will be positive and sufficient enough to give the sheet the proper and required pliancy to permit it to be deflected into a horizontal plane over the rolls 24 and 25.

The present invention is particularly well adapted for use in connection with my copending application, Serial No. 35,041, filed June 5, 1925, which discloses the idea of so positioning the rolls 24 and 25 that the roll 24 is somewhat below the horizontal line of draw of the sheet, thus dividing the deflection of the glass sheet in two obtuse angles, in place of an abrupt right angle which is apparent when the roll 24 is in alignment with the roll 25.

It is believed that by positively setting the sheet and likewise conditioning the molten glass from which it is drawn, by maintaining around the sheet and above the molten glass a positive heat absorbing atmosphere, which is in accordance with the present invention, the roll 24 may be positioned at a relatively short distance from the molten glass, and therefore making it unnecessary to draw the sheet to the height previously mentioned before deflecting it into the horizontal, as heretofore when the sheet was permitted to set with an unstable heat absorbing atmosphere.

When deflecting the sheet from the vertical plane by bending it twice, first over the roll 24 and then over the roll 25, as shown in Fig. 1, it may be necessary to employ the use of either burners 26 and 27 or coolers 28 and 29 to control the pliancy of the sheet as it is bent into the horizontal plane over the roll 25.

It may be found that by setting the glass sheet 13 in accordance with the present invention, during its vertical draw, the glass sheet may be abruptly bent at a right angle into a horizontal plane over the roll 24, as shown in Fig. 3, thus making possible the drawing of a much wider sheet than heretofore. It is a well known fact in the art of drawing sheet glass that the sheet will narrow or contract as it is drawn away from its source, regardless of the fact that width maintaining means 30 are sometimes employed. Therefore by bending the sheet before it has traveled any great distance vertically, a relatively wide sheet will result. It will also be apparent that any surface distortions heretofore tending to be set up in the sheet, due to its contraction, may be reduced. The enclosure 16 will protect the sheet 13 and rolls 24 and 25 from any objectionable heated air currents arising from the pot.

It is also believed that by employing the use of the positively controlled heat absorbing atmosphere, both above the molten glass 12 and around the glass sheet 13, the sheet may be drawn at a greater speed from the pot than that possible heretofore, thereby increasing production.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, a pot containing molten glass, means for drawing a glass sheet therefrom, a plurality of horizontal and vertical coolers arranged on each side of the glass sheet and cooperating to form a cooled hood-like structure above the portion of the molten glass from which said sheet is drawn for artificially maintaining said portion of molten glass at a relatively low temperature, and means for maintaining a supplying source of molten glass, on each side of said portion of molten glass, at a sustained relatively high temperature.

2. In sheet glass drawing apparatus, a pot containing molten glass, means for continuously drawing a glass sheet therefrom, a plurality of horizontal and vertical coolers arranged on each side of the glass sheet forming a cooled hood-like structure above the portion of the molten glass from which said sheet is drawn, thus artificially and positively maintaining said portion of molten glass at a relatively low temperature, and an L-shaped end on each horizontal cooler, which together form an opening which is artificially and positively cooled, through which said glass sheet may be drawn.

3. In sheet glass drawing apparatus, a pot containing molten glass, means for continuously drawing a glass sheet therefrom, a plurality of horizontal and vertical coolers arranged on each side of the glass sheet forming a cooled hood-like structure above and out of contact with that portion of the molten glass from which said sheet is drawn, thus maintaining a positive and artifical heat absorbing atmosphere above said portion of molten glass, and an L-shaped cooled end on each horizontal cooler, said ends being out of contact with the glass sheet and together forming a passage in which is created and maintained a positive and artificial heat absorbing atmosphere through which the glass sheet is drawn.

4. In sheet glass drawing apparatus, a pot containing molten glass, means for drawing a glass sheet therefrom, and a plurality of horizontal and vertical coolers arranged on each side of the glass sheet and cooperating to substantially cover the portion of molten glass from which the sheet is drawn for artificially maintaining said portion of molten glass at a relatively low temperature.

5. In sheet glass apparatus, a pot containing a mass of molten glass, means for forming a continuous sheet therefrom, and vertical and horizontal coolers arranged at each side of the sheet and cooperating to substantially cover the portion of molten glass from which the sheet is drawn.

6. In sheet glass apparatus, a pot containing a mass of molten glass, means for forming a continuous sheet therefrom, means for deflecting the sheet from one plane to another, and vertical and horizontal coolers arranged at each side of the sheet in advance of the point of deflection thereof and cooperating to substantially cover the portion of molten glass from which the sheet is drawn.

Signed at Toledo, in the county of Lucas and State of Ohio, this 17th day of February, 1926.

JOHN L. DRAKE.